Sept. 17, 1935.   A. H. LAMB   2,014,385
ELECTRICAL CONTROL DEVICE
Filed Sept. 8, 1933   2 Sheets-Sheet 1
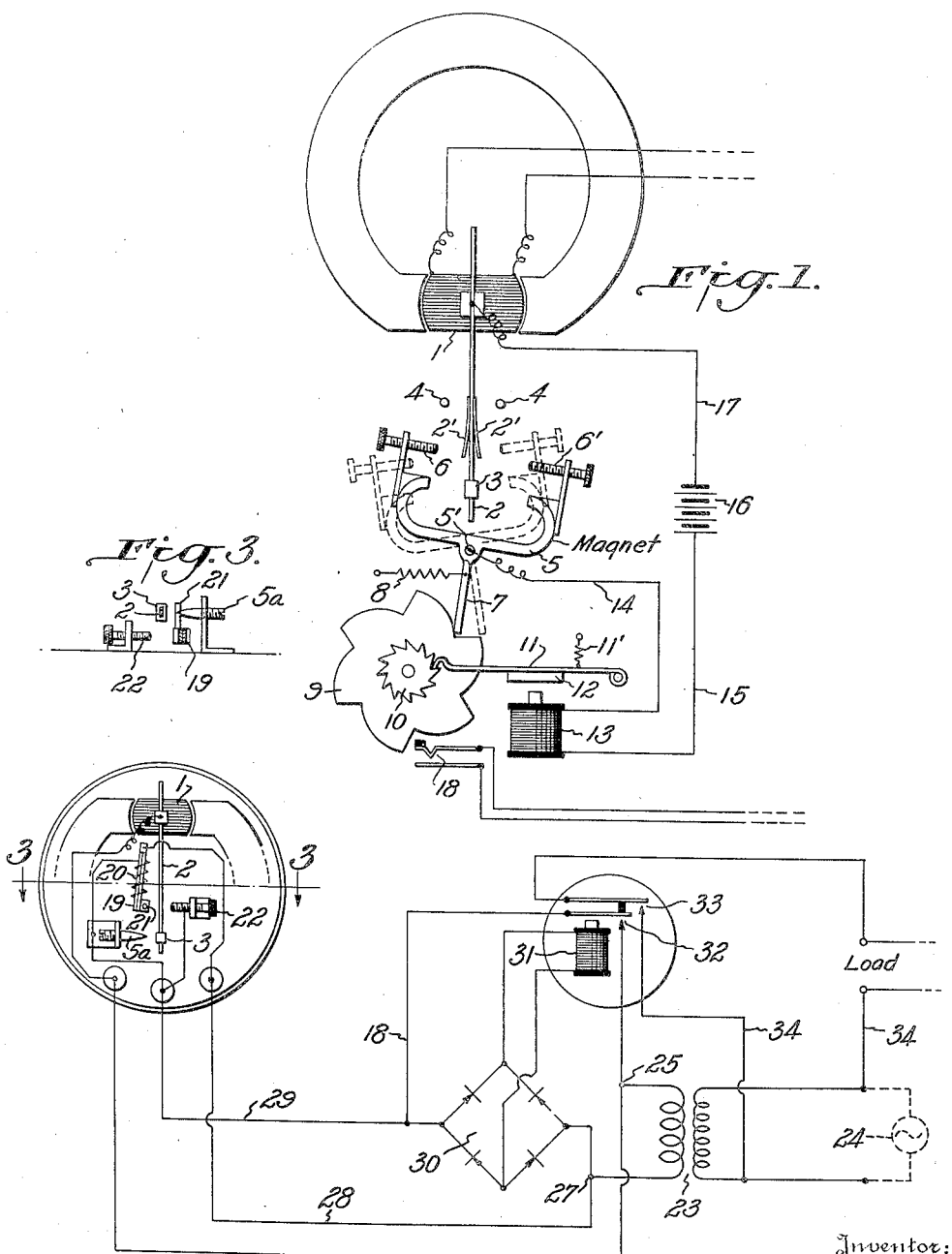

Sept. 17, 1935.                A. H. LAMB                 2,014,385
                         ELECTRICAL CONTROL DEVICE
                          Filed Sept. 8, 1933        2 Sheets-Sheet 2

Inventor:
Anthony H. Lamb,
By Byrne Townsend & Potter,
Attorneys.

Patented Sept. 17, 1935

2,014,385

UNITED STATES PATENT OFFICE 2,014,385

ELECTRICAL CONTROL DEVICE

Anthony H. Lamb, Elizabeth, N. J., assignor to Weston Electrical Instrument Corporation, Newark, N. J., a corporation of New Jersey Application September 8, 1933, Serial No. 688,696

23 Claims. (Cl. 175—320)

This invention relates to electrical control devices, and particularly to control devices of the type in which a sensitive instrument is employed to open and close a control circuit in response to small changes in the magnitude of some factor, such as light intensity, temperature, humidity and the like.

The reliability of relay or control devices of the instrument type depends upon the reliability of the electrical contact established by the instrument and this, in turn, depends upon the contact materials and the contact pressure. Appropriate contact materials may be determined for any particular system but, in general, the contact pressure is determined by the magnitude of the variable factor upon which the control is based. In the case, for example, of electrical relay instruments, the contact pressure is in direct proportion to the current flowing through the moving coil of the instrument and, where only minute currents are available for control purposes, it is impossible to obtain reliable contact pressure, i. e., pressures great enough to handle usable wattages over a reasonable length of time without continuous supervision and maintenance. Relays operated directly by the energy obtained from photoelectric cells, thermocouples, Wheatstone bridge circuits, etc. are exceedingly delicate and expensive, and are only capable of handling small wattages at low voltages. The contact circuits must be protected against arcing and chattering, and a train of auxiliary relays with sources of energy are required to handle normal line voltages.

It has been proposed to overcome these objections by the use of the so-called "depressor" control in which the movable coil deflects a pointer in the usual manner, and the contact is obtained by periodically depressing the pointer against a contact below the same. Such systems are expensive, as they require continuously running motors, and are suitable for the control of only those processes or operations in which the measured factor changes but slowly, since the pointer is depressed only at intervals, usually every thirty seconds. Depressor control systems are entirely unsuitable, for example, in cases where an instantaneous alarm or control action is to follow the momentary interruption of a light beam.

Other systems have been proposed in which the instrument moves the pointer to the vicinity of the contact and some external force then operates to obtain the contacting action. None of the proposed arrangements has been entirely satisfactory due, in general, to the type or amount of auxiliary apparatus required and/or to the fact that the device would not reset itself readily.

An object of the invention is to provide an electrical control device of the instrument type, and in which simple and inexpensive auxiliary devices cooperate with sensitive instruments to obtain contact pressures of high current carrying capacity and great reliability. A further object is to provide a sensitive instrument relay in which the contact pressure is obtained by a permanent magnet cooperating with a soft iron armature on the instrument pointer, and in which the instrument is reset by separating the magnet and armature, the resetting system being manual, semi-automatic or fully automatic.

These and other objects and advantages of the invention will be apparent from the following specification when taken with the accompanying drawings in which:

Fig. 1 is a semi-diagrammatic illustration of one embodiment of the invention;

Fig. 2 is a circuit diagram of a control system in which a thermal element is employed to reset the instrument;

Fig. 3 is a section through the instrument of Fig. 2, as viewed on section line 3—3;

Figure 4:
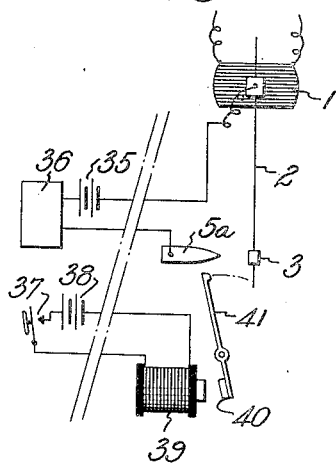
Fig. 4 is a circuit diagram of a control device including a manually operated resetting system.

As illustrated in Fig. 1, the sensitive control instrument is shown as an electrical measuring instrument having a moving coil I carrying a nonmagnetic pointer or contact arm 2 on which a small soft iron rider 3 is fixed, the angular movement of the moving system being limited by a pair of stops 4. A C-shaped magnet 5 is so positioned and pivotally mounted at its center 5' that the opposite poles of the magnet may be brought, alternately, into position to attract the magnetic rider 3 as the pointer 2 moves in opposite directions from its central or normal position.

As illustrated in Fig. 1, the customary flexible contact strips 2' may be mounted on the pointer 2 for engagement with contacts 6, 6' that are carried by, and may be adjusted with respect to, the ends of the magnet 5. The contacts 2', 6 and 2', 6' are in parallel with the rider 3 and the poles of the C-shaped magnet 5, and it is therefore apparent that the contacts 2', 6, 6' are optional and could be eliminated. The contact surfaces on rider 3 and the poles of the magnet 5, and/or the contacts 2', 6 and 2', 6', are preferably plated with gold or silver to improve the reliability of the current-carrying contact which is established by the instrument.

The magnet 5 has an arm 7 to which spring 8 is attached for yieldingly retaining the arm in the position illustrated in solid lines in Fig. 1. The magnet arm 7 bears against a cam 9 which is secured to a ratchet wheel 10 that has twice as many teeth as there are lobes on the cam. The pivoted lever or pawl 11 for actuating the ratchet is normally held in elevated position by spring 11' and carries the armature 12 of an electromagnet 13 that has one terminal connected to the magnet 5 by a lead 14. The opposite terminal is connected through lead 15 to a current source 16, such as a battery, the lead 17 completing the circuit from the current source to the pointer 2. A switch 18 in the circuit to be controlled (hereinafter designated, for convenience, as the "load circuit") comprises a pair of spring contacts so positioned adjacent the multiple-lobed cam 9 that the switch is alternately opened and closed as the cam is moved by successive actuations of the solenoid 13.

Assuming that the relay is to control the temperature of an electric furnace or other electrically heated apparatus, the moving coil 1 will be connected to a thermo-couple in the heated zone and the switch 18 will be included in the heating circuit. With the parts as shown in solid lines in Fig. 1, the temperature is within the desired range and the heating circuit is interrupted, since switch 18 is open. As the temperature falls, the current output of the thermocouple decreases and the moving coil system 1 turns clockwise to bring the magnetic rider 3 adjacent the left pole of magnet 5. When the rider enters the magnetic field it is attracted to the pole and a firm contact is established between it and the magnet 5, and between the contact 6 and the contact strip 2' of the pointer 2.

The circuit thus established through solenoid 13 and battery 16 causes armature 12 to move downward, and results in an advance of the ratchet 10 by one step. The accompanying movement of the cam 9 forces the contacts of switch 18 into engagement to establish the heating circuit, and rocks the magnet 5 in a counterclockwise direction about pivot 5'. Since movement of the pointer 2 is limited by stop 4, the magnet pole moves away from rider 3, and the contact 6 separates from the cooperating contact strip 2'. The battery circuit is thus opened and spring 11' returns the pawl lever 11 to its upward position. The relay is thereby reset for further operation and, due to the rocking movement of the magnet 5, its right hand pole is moved towards the central position of the pointer 2, as shown in dotted lines, and since the opposite pole was removed from the central position of pointer 2, it is not possible to reclose the battery circuit in the event of a further temperature drop. The next reclosure of the battery circuit takes place when the temperature reaches the upper limit of the desired range, and the armature 12 is attracted to advance ratchet wheel 10 an additional step, thus restoring the parts to their original positions.

In the embodiment of the invention shown in Figs. 2 and 3, the resetting of the instrument is effected by a bimetallic strip 19 that has its heating coil 20 in a circuit that is closed by the instrument contacts. As shown, the auxiliary contacts of the Fig. 1 instrument have been omitted and the small permanent magnet 5a attracts and makes a firm electrical contact with the magnetic rider 3 on the contact arm or pointer 2. The pole of magnet 5a is preferably pointed and plated, as described above, to improve the electrical characteristics of the contact. The movable end of the strip 19 carries a pusher arm 21 of insulating material for engaging the pointer 2 when the strip is heated and flexed by current flow in the coil 20. The strip 19 is positioned below the path of movement of the pointer 2 and, when heated, the free end moves below the pointer 2 to engage the resetting contact 22.

The instrument contacts 3, 5a are included in the secondary circuit of a transformer 23 which has a primary adapted to be connected across an appropriate current source 24, such as the usual 60 cycle lighting circuit. One terminal 25 of the secondary winding is connected by lead 26 to the pointer 2, and the second terminal 27 is connected, through lead 28 and the heating coil 20, to the magnetic contact 5a. Contact 5a is also connected to the resetting contact 22 and by lead 29 to one input terminal of the rectifier bridge 30. The terminal 27 of the secondary is connected to the other input terminal of the bridge, and the winding 31 of a magnetic switch or auxiliary relay is connected across the direct current output terminals of the bridge. When the instrument contacts 3, 5a are engaged, the alternating current circuit to the bridge is completed and flow of rectified current in winding 31 closes the switches 32, 33; the switch 32 being in parallel with contacts 3, 5a to complete a holding circuit for winding 31, and the switch 33 being included in one of the leads 34 which connect the load circuit across the current source 24.

As in the system shown in Fig. 1, the soft iron rider 3 and permanent magnet 5a provide a reliable contact when the pointer 2 is deflected to bring the rider 3 into the magnetic field of the magnet. When the secondary circuit of transformer 23 is closed by contacts 3, 5a, current is supplied to the heating coil 20 which is shunted across the input terminals of the rectifier bridge. The resultant heating and bending of the strip 19 brings the pusher arm 21 against the pointer 2, thereby forcing the rider 3 away from the magnetic contact 5a to open the instrument contacts.

The further bending of the strip 19 brings the latter into engagement with the resetting contact 22, and thus short-circuits the input circuit of the rectifier bridge. The flow of rectified current is stopped by this short circuit, thereby deenergizing solenoid 31 and opening the switches 32, 33. The system is thus reset by the thermally actuated member 19 which comes into play as soon as the instrument contacts are closed.

As shown in Fig. 4, the sensitive relay or control system may be an instrument having a moving system 1 including a pointer 2 on which a soft iron rider 3 is mounted, the rider and the cooperating magnet 5a constituting the switch element in a circuit which includes a current source 35 and an indicator, control or alarm device 36. In this form of the invention, the instrument is reset manually by closing switch 37 in the circuit including a current source 38 and the winding of an electromagnet 39, the pivoted armature 40 of the magnet carrying a pusher arm 41 for forcing the pointer away from the magnet 5a. As indicated by the breaking away of parts of the relay and resetting circuits, the controlled device 36 and resetting switch 37 may be located at some distance from the control instrument.

Figure 5:
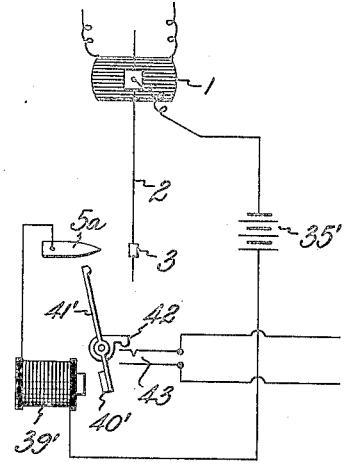
Figs. 5 and 6 are circuit diagrams of control devices including automatic, solenoid-operated resetting systems.

A modified arrangement of an electromagnetic resetting system which operates automatically is shown in Fig. 5. For automatic operation, the winding 39' is included in a series circuit with contacts 3, 5a and the current source 35', and the pivoted armature 40' actuates both the pusher arm 41' and a cam 42 which closes the switch 43 in the load circuit when the contacts 3, 5a engage to establish current flow in winding 39'.

Figure 6:
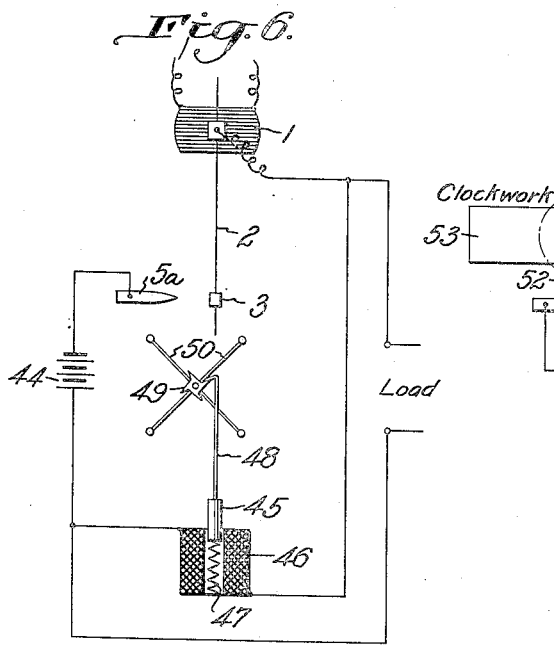

As shown in Fig. 6, the load circuit and a magnetic resetting circuit may be connected in parallel across a current source 44 when the rider 3 on the moving system 1, 2 engages the magnetic contact 5a. As illustrated, the pivoted armature construction of Figs. 4 and 5 is here replaced by a reciprocating armature 45 which is drawn into solenoid 46 when the latter is energized. The armature 45 is normally held in raised position by a spring 47 and carries a pawl 48 that engages ratchet 49 to rotate the pusher arms 50 to force the rider contact 3 away from the magnetic contact 5a.

Figure 7:
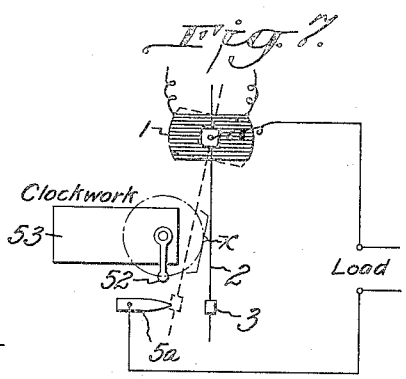
Fig. 7 is a fragmentary diagrammatic view of a control device employing a clock mechanism for periodically resetting the control instrument.

The described arrangements provide a manual or an automatic resetting of the instrument after the contacts close but, for some uses, a periodic resetting operation is satisfactory. As shown in Fig. 7, a pusher arm 52 is continuously rotated by a clockwork mechanism 53, the end of the pusher arm following a circular path that has a portion $x$ extending beyond the position occupied by pointer 2 when the rider 3 engages the magnet 5a to close the load circuit.

For simplicity of illustration and description, the instruments or primary relays of Figs. 2 to 7 inclusive have been shown as of the type in which the contact arm closes a control or relay circuit at only one extremity of its range of movement. It will be apparent that, by an obvious duplication of the necessary elements, the instrument pointer may establish a reliable contact at both of the extreme positions.

The several illustrated embodiments of the invention indicate the wide latitude of the possible design of a control and/or relay system constructed in accordance with the invention. It will be apparent that the invention is not restricted to the illustrated constructions and circuits, and that various arrangements may be employed in the construction of sensitive relay or control systems in which a permanent magnet is employed to secure a reliable contact and in which some appropriate means is included for resetting the instrument.

I claim:

1. A control device comprising a measuring instrument having a relatively stationary contact and a moving system carrying a cooperating contact, one of said contacts being of magnetic material and the other being a magnetized body operative to attract said magnetic material contact when said moving system brings its associated contact into predetermined position with respect to the relatively stationary contact, and contact-separating means additional to said moving system for forcing said contacts apart in opposition to the magnetic attraction of said magnetized body for said magnetic material contact.

2. A control device comprising a measuring instrument having a relatively stationary magnetized contact and a moving system including a contact of magnetic material, whereby said contacts engage by magnetic attraction when brought into predetermined proximity by the moving system of said instrument, and means additional to said moving system for separating said contacts to reset said instrument.

3. A control device as claimed in claim 2, wherein said separating means includes a pusher arm and means for actuating said pusher arm to separate the said contacts.

4. A control device as claimed in claim 2, wherein said separating means includes a pusher arm and means manually operable to actuate said pusher arm to separate the said contacts.

5. A control device as claimed in claim 2, wherein said separating means includes a pusher arm and means for actuating said pusher arm to force said moving system contact away from the relatively stationary contact.

6. A control device as claimed in claim 2, in combination with a load circuit having a switch therein and means actuated by said separating means for operating said load circuit switch.

7. A control device as claimed in claim 2, wherein said separating means includes a pusher arm and electrically operated means for actuating the same.

8. A control device as claimed in claim 2, wherein said separating means includes a pusher arm and mechanically operated means for periodically actuating the same.

9. A control device comprising an instrument having a moving system carrying a contact for cooperation with a relatively stationary contact, one contact being a magnetized body and the other being of magnetic material, means adapted to be actuated to separate said contacts from each other, and means energized by an engagement of said contacts for actuating said separating means.

10. A control device as claimed in claim 9, wherein said instrument includes a pair of relatively stationary contacts cooperating with said moving system contact, and said separating means is actuated into alternative positions by said last means to insure alternate engagements of said moving system contact with the respective stationary contacts.

11. In a relay and control system, an instrument including a stationary contact and a moving system carrying a cooperating contact, a magnetic rider on said moving system, a permanent magnet positioned to attract said rider when said moving system brings said contacts approximately into engagement, electrically-operated means, a source of current for energizing said means, circuit elements including said contacts for completing a circuit to energize said means from said current source, and means actuated by said first means for separating said magnet and rider.

12. A relay and control system as claimed in claim 11, in combination with a load circuit having a switch included therein, and means actuated by said electrically-operated means for operating said switch.

13. A relay and control system as claimed in claim 11, wherein said electrically-operated means comprises a solenoid having an armature, and said separating means is a pusher arm actuated by the armature of said solenoid.

14. A relay and control system as claimed in claim 11, wherein said electrically-operated means comprises a bimetallic strip having a heating coil adjacent thereto, and means including a contact engageable by said strip when deflected to interrupt current flow in said heating coil; and said separating means comprises a pusher arm mounted on the free end of said bimetallic strip.

15. In a relay and control system, an instrument having a moving system including a pointer for completing a circuit to a stationary contact, a magnetic rider on said pointer, a permanent magnet cooperating with said armature to insure a firm contact engagement between said pointer and contact, and means for separating said magnet and rider; said means including an electromagnet having an armature, and a pusher arm actuated by said armature for forcing said pointer and rider away from said magnet.

16. In a relay and control system, the combination with a source of alternating current, a load circuit to be energized from said current source and including a switch, an electromagnet for operating said switch, means for energizing said electromagnet, said means comprising a transformer having a primary connected across said source and a secondary for supplying current to said electromagnet, an instrument having a movable contact arm and a stationary contact, said contact arm and contact constituting a switch in series between said secondary and said electromagnet, a magnetic rider on said contact arm, a permanent magnet cooperating with said rider, and means operable automatically upon the engagement of said contact arm and contact for forcing said rider away from said magnet and for short-circuiting said secondary, thereby to reset said relay and control system.

17. A relay and control system as claimed in claim 16, wherein said electromagnet is a direct current magnet and rectifier means is included in the circuit connecting said electromagnet across said secondary.

18. A relay and control system as claimed in claim 16, in combination with a holding switch actuated by said electromagnet and in parallel with the switch constituted by said contact arm and contact; and wherein said automatic means comprises a bimetallic strip carrying a pusher arm for engagement with said contact arm, a heating coil for said strip and adapted to be connected across said secondary through said contact arm and contact, and a circuit for short-circuiting said secondary, said circuit including said strip and a contact engageable by said strip when deflected beyond that point which forces said rider from said magnet.

19. A relay comprising an instrument having a moving system including a contact arm, a stationary contact, a magnetic rider on said contact arm, a permanent magnet cooperating with said rider to obtain a firm contact engagement of said contact arm and contact, a pusher arm for forcing said rider away from said magnet, and mechanical means for actuating said pusher arm.

20. A relay as claimed in claim 19, wherein said mechanical means comprises a clockwork mechanism for periodically actuating said pusher arm.

21. A relay as claimed in claim 19, wherein said permanent magnet constitutes said stationary contact, and said magnetic rider constitutes the cooperating contact portion of the contact arm.

22. In a relay, an instrument including a moving system having a contact arm for engagement alternatively with a pair of opposed contacts, a magnetic rider on said contact arm, means comprising a magnet cooperating with said rider to insure a reliable contact engagement between said contact arm and contacts, and resetting means operable upon the engagement of said contact arm with one of said contacts for separating said magnet and rider, said resetting means including means for insuring engagement of said contact arm alternatively with the contacts of said pair of opposed contacts.

23. A relay as claimed in claim 22, wherein said magnet is C-shaped, and the poles thereof constitute the said pair of opposed contacts.

ANTHONY H. LAMB.